US009810191B2

(12) United States Patent
Bengtsson et al.

(10) Patent No.: US 9,810,191 B2
(45) Date of Patent: Nov. 7, 2017

(54) ENGINE FOR VEHICLE USING ALTERNATIVE FUELS

(71) Applicant: SEM AB, Åmål (SE)

(72) Inventors: Jörgen Bengtsson, Svanskog (SE); Lars-Åke Andersson, Åmål (SE); Bert Gustafsson, Åmål (SE)

(73) Assignee: SEM AB (SE)

( * ) Notice: Subject to any disclaimer, the term of this patent is extended or adjusted under 35 U.S.C. 154(b) by 87 days.

(21) Appl. No.: 14/376,630

(22) PCT Filed: Feb. 11, 2013

(86) PCT No.: PCT/SE2013/050114
§ 371 (c)(1),
(2) Date: Aug. 5, 2014

(87) PCT Pub. No.: WO2013/119178
PCT Pub. Date: Aug. 15, 2013

(65) Prior Publication Data
US 2015/0032361 A1     Jan. 29, 2015

(30) Foreign Application Priority Data

Feb. 9, 2012   (SE) ...................... 1250100

(51) Int. Cl.
*F02P 17/12*   (2006.01)
*G01M 15/11*   (2006.01)
(Continued)

(52) U.S. Cl.
CPC ............. *F02P 17/12* (2013.01); *G01M 15/11* (2013.01); *F02D 35/021* (2013.01);
(Continued)

(58) Field of Classification Search
CPC ..... F02P 17/12; G01M 15/11; F02D 41/0027; F02D 2200/1015; F02D 35/021; F02M 21/029
(Continued)

(56) References Cited

U.S. PATENT DOCUMENTS 4,109,181 A * 8/1978 Murase ..................... H01J 11/00
                                                   345/61
5,349,930 A * 9/1994 Maruyama ............. G01R 15/16
                                                   123/143 C
(Continued)

FOREIGN PATENT DOCUMENTS

DE      4437480 C1      3/1996
EP      1217207 A2      6/2002
JP      2001050114 A    2/2001

OTHER PUBLICATIONS

International Search Report dated May 8, 2013 corresponding to International Patent Application No. PCT/SE2013/050114, 5 pages.
(Continued)

*Primary Examiner* — Joseph Dallo
(74) *Attorney, Agent, or Firm* — Eric L. Sophir; Dentons US LLP

(57) ABSTRACT

This invention relates to an engine for a vehicle using alternative fuel, preferably gas, comprising an engine (5) having a spark ignited ignition system (2) wherein said ignition system (2) includes misfire detection by means of a sensor device (4) providing information to a control system (20), connected to or within said ignition system (2), and wherein said combustion includes diluted operation to optimize emissions wherein said sensor device (4) includes an ion sensing measurement means (40) arranged to measure an ion current in said engine (5) and that said ignition system
(Continued)

(2) has a built-in function to detect misfiring through an analysis of the ion current of the engine (5) during combustion.

13 Claims, 2 Drawing Sheets

(51) Int. Cl.
    *F02M 21/02* (2006.01)
    *F02D 35/02* (2006.01)
    *F02D 41/00* (2006.01)
(52) U.S. Cl.
    CPC .. *F02D 41/0027* (2013.01); *F02D 2200/1015* (2013.01); *F02M 21/029* (2013.01)
(58) Field of Classification Search
    USPC ......... 73/35.08, 114.08, 114.02; 123/406.14, 123/435, 406.21, 406.27, 406.28, 568.21; 701/108
    See application file for complete search history.

(56) References Cited

U.S. PATENT DOCUMENTS

| | | | | |
|---|---|---|---|---|
| 5,363,046 A * | 11/1994 | Shimasaki | | F02P 13/00 324/126 |
| 5,376,886 A * | 12/1994 | Shimasaki | | F02P 7/026 324/402 |
| 5,437,154 A | 8/1995 | Sato et al. | | |
| 5,438,970 A * | 8/1995 | Maruyama | | F02P 17/12 123/630 |
| 5,461,316 A * | 10/1995 | Maruyama | | F02P 17/12 324/126 |
| 5,548,220 A * | 8/1996 | Kawamoto | | F02P 17/12 123/479 |
| 5,602,332 A * | 2/1997 | Pyko | | F02P 11/06 73/114.08 |
| 5,801,534 A * | 9/1998 | Hohner | | F02P 17/12 123/644 |
| 5,828,217 A * | 10/1998 | Inagaki | | F02P 17/12 123/627 |
| 5,964,811 A * | 10/1999 | Ishii | | F02D 41/266 123/479 |
| 6,020,742 A * | 2/2000 | Kano | | F02P 17/12 324/378 |
| 6,216,530 B1 * | 4/2001 | Shimizu | | F02P 17/12 73/114.08 |
| 6,222,367 B1 * | 4/2001 | Shimizu | | F02P 17/12 324/378 |
| 6,222,368 B1 * | 4/2001 | Inagaki | | F02P 17/12 324/399 |
| 6,298,717 B1 | 10/2001 | Nishimura | | |
| 6,298,837 B1 * | 10/2001 | Ketterer | | F02P 9/002 123/609 |
| 6,348,797 B1 * | 2/2002 | Shimizu | | F02P 17/12 324/378 |
| 6,411,119 B1 * | 6/2002 | Feldtkeller | | H02M 3/33507 324/750.3 |
| 6,498,490 B2 * | 12/2002 | Karau | | F02P 17/12 324/380 |
| 6,725,834 B2 * | 4/2004 | Yorita | | G01L 23/221 123/406.29 |
| 6,799,564 B2 * | 10/2004 | Forster | | F02P 3/053 123/644 |
| 6,813,933 B1 * | 11/2004 | Ketterer | | F02P 17/12 123/644 |
| 7,124,019 B2 * | 10/2006 | Goodell | | F02P 17/12 324/388 |
| 7,603,226 B2 * | 10/2009 | Henein | | F02D 35/021 701/109 |
| 8,040,137 B2 * | 10/2011 | Agneray | | F02P 3/01 324/384 |
| 8,438,906 B2 * | 5/2013 | Heinzelmann | | F02D 35/027 73/35.08 |
| 8,776,584 B2 * | 7/2014 | Hoehne | | G01M 15/14 73/112.01 |
| 8,985,090 B2 * | 3/2015 | Bolz | | F02P 15/10 123/618 |
| 2002/0069696 A1 * | 6/2002 | Hatazawa | | F02D 35/021 73/114.12 |
| 2003/0164025 A1 * | 9/2003 | Kiess | | F02P 17/12 73/35.08 |
| 2003/0164164 A1 * | 9/2003 | Butler, Jr. | | G01L 23/225 123/606 |
| 2003/0172907 A1 * | 9/2003 | Nytomt | | F02D 35/023 123/406.14 |
| 2003/0196481 A1 * | 10/2003 | Okamura | | G01L 23/22 73/114.12 |
| 2003/0197511 A1 * | 10/2003 | Takahashi | | F02P 17/12 324/399 |
| 2003/0200023 A1 * | 10/2003 | Matsushita | | G01M 15/11 701/114 |
| 2003/0209211 A1 | 11/2003 | Collier, Jr. | | |
| 2004/0083717 A1 * | 5/2004 | Zhu | | F01N 3/2006 60/284 |
| 2004/0083794 A1 * | 5/2004 | Daniels | | F01L 1/08 73/35.08 |
| 2004/0084018 A1 * | 5/2004 | Zhu | | F01N 3/2006 123/406.14 |
| 2004/0084019 A1 * | 5/2004 | Zhu | | F01N 3/2006 123/406.21 |
| 2004/0084020 A1 * | 5/2004 | Daniels | | F01N 3/2006 123/406.23 |
| 2004/0084021 A1 * | 5/2004 | Zhu | | F01N 3/2006 123/406.27 |
| 2004/0084025 A1 * | 5/2004 | Zhu | | F01N 3/2006 123/435 |
| 2004/0084026 A1 * | 5/2004 | Zhu | | F01N 3/2006 123/435 |
| 2004/0084034 A1 * | 5/2004 | Huberts | | F02M 26/01 123/630 |
| 2004/0084035 A1 * | 5/2004 | Newton | | F02M 26/01 123/630 |
| 2004/0084036 A1 * | 5/2004 | Porter | | F02D 35/027 123/634 |
| 2004/0085068 A1 * | 5/2004 | Zhu | | F01N 3/2006 324/382 |
| 2004/0085070 A1 * | 5/2004 | Daniels | | F02M 26/01 324/391 |
| 2004/0088102 A1 * | 5/2004 | Daniels | | F01N 3/2006 701/108 |
| 2006/0238144 A1 * | 10/2006 | Ando | | F02P 17/12 315/307 |
| 2007/0079817 A1 * | 4/2007 | VanDyne | | F02D 35/021 123/568.21 |
| 2007/0186902 A1 * | 8/2007 | Zhu | | F02P 17/12 123/406.34 |
| 2007/0186903 A1 * | 8/2007 | Zhu | | F01N 3/2006 123/406.37 |
| 2008/0289600 A1 | 11/2008 | Kurotani et al. | | |
| 2009/0132145 A1 * | 5/2009 | Angeby | | F02D 35/02 701/102 |
| 2011/0088646 A1 * | 4/2011 | Tanaya | | F02P 5/15 123/179.3 |
| 2011/0203358 A1 * | 8/2011 | Tanaya | | F02D 35/021 73/114.03 |
| 2012/0312285 A1 * | 12/2012 | Bolz | | F02P 15/10 123/623 |
| 2014/0076295 A1 * | 3/2014 | Zheng | | F02P 9/002 123/621 |

OTHER PUBLICATIONS

Kaiadi, M. Diluted Operation of a heavy-duty Natural Gas Engine. Aiming at Improved Efficiency, Emissions and Maximum Load.

(56) References Cited

OTHER PUBLICATIONS

Doctoral theses. Division of Combustion Engines. Dept. of Energy Sciences. Faculty of Engineering, Lund Univ. Jan. 2011.

* cited by examiner

ENGINE FOR VEHICLE USING ALTERNATIVE FUELS

CROSS-REFERENCE TO RELATED APPLICATIONS

This application claims priority to PCT/SE2013/050114, filed Feb. 11, 2013, which claims priority to Swedish Patent Application No. 1250100-3, filed Feb. 9, 2012, all of which are incorporated by reference in their entirety.

FIELD OF THE INVENTION

The present invention relates to an engine for a utility vehicle using alternative fuel, preferably gas, comprising an engine having an engine management system including an ignition control system wherein said ignition system includes misfire detection by means of a sensor device providing information to said ignition control system, and wherein said combustion includes diluted operation to optimize emissions.

BACKGROUND INFORMATION

Today when using utility vehicles, such as a truck or a bus, there are some legislative demands that assist in reducing pollution. However, different engine types need different control parameters to optimize combustion. For instance a diesel-powered engine will need no system that detects misfiring, whereas an engine powered by alternative fuels will need such a system to optimize combustion. It is becoming more and more common to use engines powered by alternative fuels for utility vehicles and therefore also an increased need of systems that may detect other parameters than those needed to meet todays legislative demands for diesel engines, e.g. an increased need for detecting misfiring.

Detecting misfiring can be made in different ways. To meet this demand the control system of the vehicle has to be completed with a function for detecting misfiring. This can be both an expensive and an advanced procedure.

The document JP 2001050114 shows a method to detect misfiring in an engine powered by compressed natural gas. The method is founded on analysis of variables as rotational speed of the engine and a feedback of the air/fuel ratio. This is a typical example which will be both expensive and require an advanced procedure.

The document US 2008289600 shows a method for an engine to use two types of fuels with different octane numbers and ion current analysis is used to calculate the combustion timing such that the fuel mix to each cylinder may be adjusted from this calculation. The document also suggests that misfiring may be detected by a sensor signal from the rotational speed or by measurement of temperature and oxygen concentration in the exhausts through existing sensors in the engine. However, this method inherently comes with some disadvantages, e.g. that it is a complex system in need of a multiplicity of different sensors supplying a complex set of signals, i.a. leading to a risk for misinterpretation of combinations of the signals.

Many control system are known that use ion current sensing to detect different aspects and to control combustions parameters. From US 20030200023 (D2) and US 20030209211 (D3) there are known such a systems, which however do not present any solution how to also handle misfire detection in a reliable manner. U.S. Pat. No. 6,298,717 (D4) presents another system which suggests the use of a ion sensing in combination with revolution data, depending on operation conditions, implying a complex mode of functioning. "Kaiadi, M *Diluted Operation of a Heavy-duty Natural Gas Engine. Aiming at Improved Efficiency, Emissions and Maximum Load*. Doctoral thesis. Division of Combustion Engines. Department of Energy Sciences. Faculty of Engineering. Lund University. Doktorsavhandling. Januari 2011." (D1) describes another known system using ion current sensing as one of many means to optimize combustion, but it does not provide any reliable solution regarding how to detect misfires using ion current in diluted SI-engines.

SUMMARY OF THE INVENTION

It is an object of the present invention to improve upon the situation described above, which is obtained by an engine in accordance with claim 1.

Thanks to this invention a reliable and relatively inexpensive way is obtained for providing engines for utility vehicles, powered by alternative fuels to obtain optimized control of combustion, e.g. to more easy fulfill the legislative demands regarding emissions.

According to another aspect of the invention it gives the advantage that an engine built in accordance with the invention may be cost-efficiently converted from diesel to alternative fuels.

According to another aspect of the invention said built-in function comprises a combination of ion current information and information about discharge current and/or spark-over voltage that covers detection of misfiring in more reliable and easy manner than feasible with known systems.

DETAILED DESCRIPTION OF THE INVENTION

Figure 1:
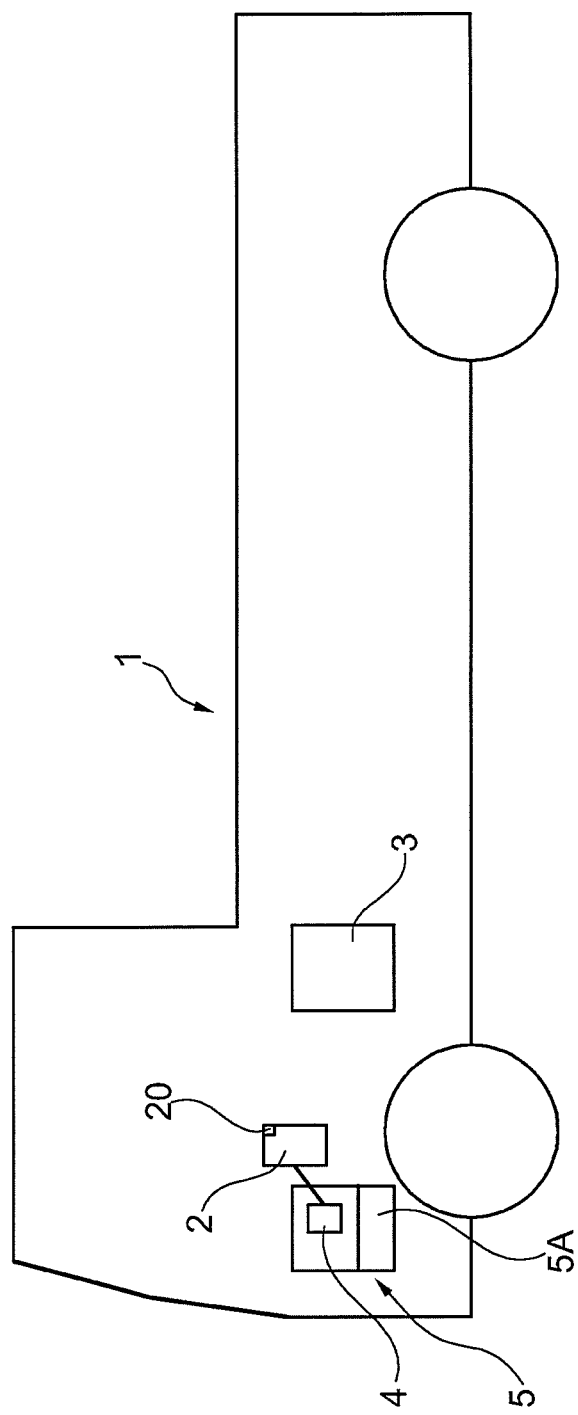
FIG. 1 shows a schematic view of a vehicle according to the invention.

FIG. 1 schematically shows a utility vehicle 1 having an engine 5, an engine management system 2 and a fuel tank 3, wherein the engine management system 2 includes a CPU (not shown) that controls the combustion of the engine 5, i.e. by means sensor signals from a sensing device 4.

In a preferred embodiment the engine 5 has an engine block 5A that has a total cylinder volume of at least 3 dm$^3$, more preferred between 5-12 dm$^3$. To enable optimizing the combustion in relation to an engine powered by an alternate fuel there is used an ignition system, being controlled by an ignition control system 20 receiving sensor signals from an ion sensing measurement means 40. Accordingly, ignition control system 20 forms a sub system within the engine management system 2. Said ion sensing measurement means 40 is arranged to measure an ion current in the engine 5, which in turn may be used to optimize combustion, e.g. by controlling Air/Fuel rate, ignition timing, etc. In the preferred embodiment the ignition control system 20 does not merely control basic parameters, but also has a built-in function arranged to analyze the ion current to detect misfiring. Thanks to having such a function built in (i.e. the engine management system 2 being provided with appropriate software and means for sensor input) the misfire detection ability may be obtained without any "add-on". More preferred said built-in function may also comprises a combination of detecting ion current information and information about discharge current and/or spark-over voltage, to enable even more sophisticated control of the combustion.

In the preferred mode the engine 5 according to the invention the engine is equipped with means (not shown) for diluted operation, wherein the engine management system 2 controls the diluted operation to achieve stoichiometric combustion, i.e. the engine 5 operating at λ equal to one. A three way catalyst (not shown) may be used to provide extra safety for attaining low emissions. Diluted operation implies that an extra amount of inert gas is added to optimize the combustion, which in applications with larger engines (i.e. larger than 3 dm$^3$) will lead to relatively large amounts of inert gas. The amount of course varies with the load, but it is foreseen that the means and control system 2 shall provide for enabling supply of a maximum amount of inert gas of at least 10%, and in some applications a maximum up to 30%, preferably it shall enable a peak supply between 15-25%. One preferable way to obtain this is by means of Exhaust gas recirculation (EGR) wherein the recirculated amount is controlled by means of input from the ion sensing measurement means 40/control system 2.

Furthermore it is preferable that a modular engine construction system is used enabling use of common parts both for diesel and alternative fuels, e.g. the engine block 5A and basic elements of the engine management system 2. Preferably in a manner enabling conversion, from diesel to alternative fuels, in a manner as cost efficient as possible, e.g. implying using several common parts for the engine 5, etc. When using alternative fuels some additional aspects have to be considered for optimal engine control (as mentioned above) and therefore it is an advantage to use basic elements of the engine management system 2 that may allow easy adaptation of a diesel engine to an alternative fuel. For instance the housing of the engine management system 2 is preferably equipped with extra input connections, enabling easy interconnection when installing supplementary equipment (for control of an engine using alternative fuel), e.g. of an ion sensing measurement means 40. Furthermore the software may also then easily be prepared for a swift conversion enabling optimized combustion, i.e. low emissions/pollution.

Figure 2:
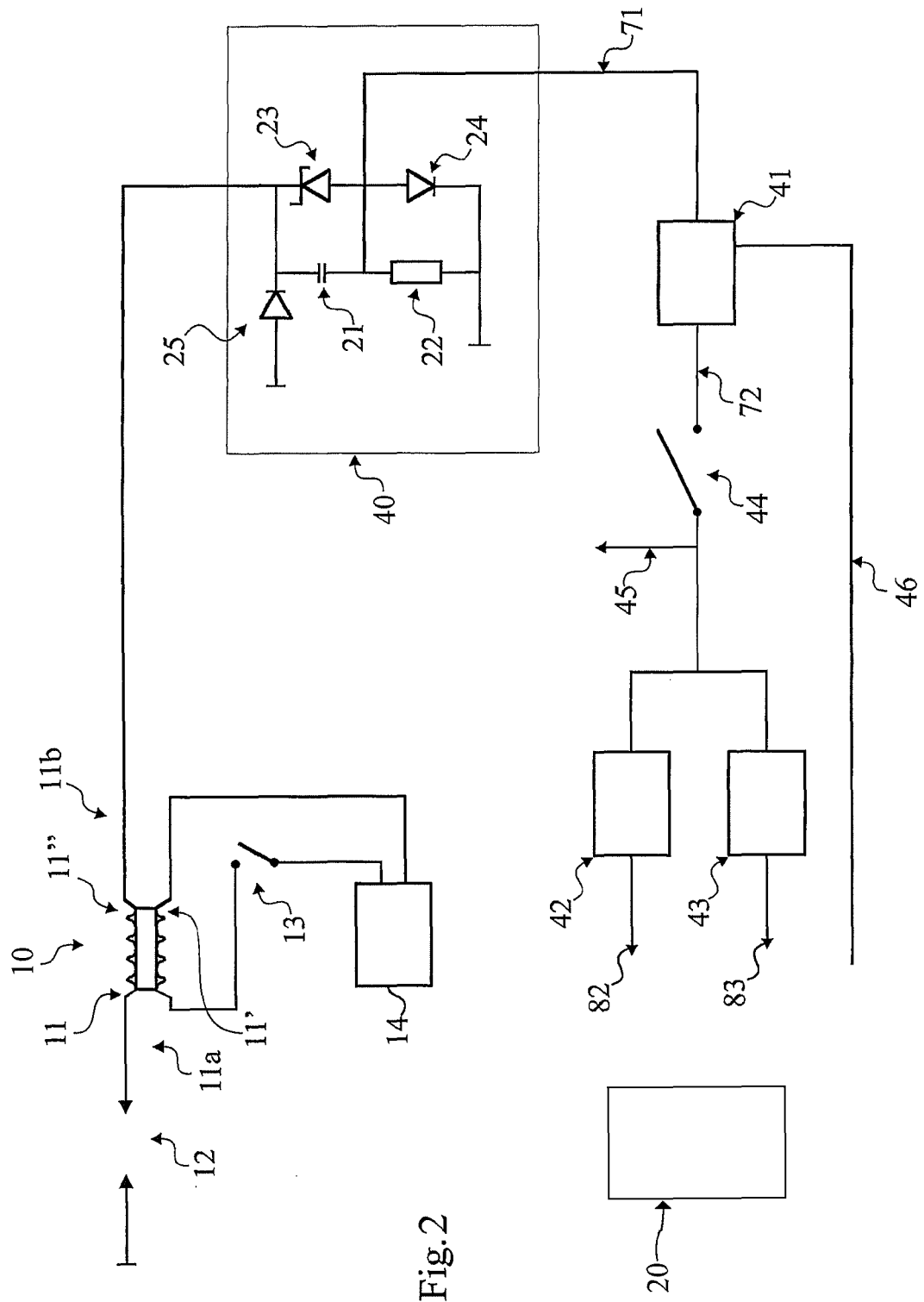
FIG. 2 shows a circuit diagram for a sensor device according to an exemplary embodiment of the invention.

In FIG. 2. there is shown an exemplary control circuit to describe the general principles of the invention, and whereby also other parameters, e.g. knock may be detected.

In the circuit diagram of FIG. 2 a spark generating means 10 is shown comprising a coil 11 with secondary coil 11" that has a first end 11a connected to a spark plug 12 and a second end 11b connected to an ion current measurement means 2. The coil 11 comprises a primary coil 11' to which a current is lead from a power supply 14 such as a battery or a capacitor for inducing a current in the secondary coil 11". A primary switch 13 is used to control the flow of a current in the primary coil 11' and the operation of this switch 13 is determined by a control unit 61 (not shown).

The current that is induced in the secondary coil 11" flows to the spark plug 12, but also to the ion current measurement means 40 that are connected to the secondary coil 11" by its second end 11b. During a spark event, a spark current is created that flows to or from the spark plug and thereby creates a current that in turn induces a second current component at the second end 11b of the secondary coil 11". This current is used to charge a capacitor 21. This current will charge the capacitor to a voltage that equals a Zener voltage. After the spark event, the capacitor voltage will supply a voltage in a range of 60-400 V to a spark gap and if ions are present, an ion current will flow that is further transmitted to an amplifier 41 in the form of a first signal 71. The amplifier 41 is a variable-gain amplifier and amplifies the first signal 71 to form an amplified signal 72.

When a coil select switch 44 is closed, the amplified signal 72 is transmitted towards a band pass filter 43 connected to an analysing means 20 by a first connection 82, and towards a low pass filter 42 connected to an analysing means 20 by a second connection 83. The analysing means 20 can be used for analysing the amplified signal 72 and yield information regarding the operation of the spark generation means 1 and the combustion, and further the analysing means 20 may be arranged to adjust a gain of the amplifier 41 via a third connection 46. The operation of the first and second analysing means will be described in more detail further below.

The spark generating means 1 can comprise a plurality of coils 11, each connected to a power supply 14 and divided by a primary switch 13 each that is connected to the power supply, so that only one primary coil 11' at a time can be used for generating a spark in the spark plug 12 in the active cylinder.

Any sparks generated by the spark plug 12 are used for igniting an air and fuel mixture inside a cylinder 51 (not shown) or a plurality of cylinders 52 (not shown). The timing of the spark is controlled by the control unit 20 that controls the connecting of each primary switch 13 that serves to create a current in the secondary coil 11" and thereby generates the spark at the spark plug 12.

According to a preferred embodiment within the scope of invention each coil 11 is connected to a separate ion current measurement means 40 and onwards to a separate amplifier 41, and via a fourth connection 45 each such separate amplifier 41 can be connected to the low pass filter 42 and band pass filter 43. Thanks to a coil select switch 44, the operation of the circuits can be controlled so that signals from only one of the separate amplifiers 41 are allowed to reach the low pass filter 42 and band pass filter 43 at the time. Thereby, signals with information regarding ion currents from more than one spark generating means 10 and cylinder 52 can be analysed by the same analysis means 20, thereby yielding detailed and comprehensive information to a control unit 20, that can be the same unit as the control unit 20 used for controlling the generation of sparks, or can alternatively be a separate control unit.

Preferably, properties of the ion current that can be detected at the second end 11b of the secondary coil 11" are only analysed during a section of a revolution of a cylinder 51, namely during a time interval when a knock event will occur. This section is preferably 0°-90°, more preferably 0°-50°, even more preferably 10°-40° of a revolution of a crank shaft of a cylinder, and it is advantageous if the section starts at a position when a piston of the cylinder 51 is at a top dead centre (TDC) position, thereby giving the position for 0° at this TDC position. Thereby, the analysis that is performed by the analysing means 20 uses only the section that comprises the information that is sought, e.g. the occurrence of a combustion event, to enable detection of misfire (i.e. if no detection of any combustion event a misfire has occurred). Further the system may also be used to detect other aspects, e.g. a knock event. The novel principle enables the analysing means to analyse signals 72 from more than one cylinder 51, so that the fourth connection 45 and the coil select switch 44 can be operated to allow the amplified signal 72 that is generated from the performance of a specific coil 11 to reach the analysing means during this section of the revolution. The analysing means can thereby receive signals 72 from a plurality of amplifiers 41 and arrive at a comprehensive analysis regarding most or all of the cylinders 51 in a specific engine.

According to a preferred mode of the invention the circuitry also includes features to detect other many different kind of faulty operations, e.g. features that detect that the spark plug is short circuited and/or if the spark excites somewhere else than in the combustion chamber, because under such conditions the ion current on its own may not be used to detect such a fault. This may be achieved by analyzing the ion current in combination with spark-over voltage and/or primary current/voltage.

It is evident that many modifications may be performed without departing from the scope of the invention. For instance it is realized that many different kind of alternate fuels may be used in connection with the invention, e.g. Natural gas, LPG (liquefied propane gas), alcohols like ethanol and methanol, hydrogen gas, biogas or wood gas.

The invention claimed is:

1. A combustion engine comprising:
    a sensor device including an ion sensing measurement device configured to provide measurements of an ion current in said combustion engine during combustion;
    a spark generating system for causing spark events to generate the ion current in said combustion engine during combustion, wherein the spark generating system is configured to provide information about discharge current during each spark event;
    an engine management system, including an ignition control system that receives the measurements of the ion current in said combustion engine during combustion from the sensor device, and that receives the information about the discharge current during each spark event from the spark generating system,
    wherein the ignition control system is configured to detect misfiring through a combined analysis comprising an analysis of the measurements of the ion current in said combustion engine during combustion received from the sensor device, the combined analysis further comprising an analysis of the information about the discharge current during each spark event received from the spark generating system, wherein the engine management system is configured to control an operating parameter of the spark generating system comprising at least one of discharge current, spark-over voltage, and primary current/voltage, subsequent to each spark event based upon the combined analysis, and
    wherein the engine management system is configured to control diluted operation of the combustion engine, wherein the diluted operation provides for peak values of at least 10% of diluted gas.

2. The combustion engine according to claim 1, wherein said combustion engine includes an engine block having a total cylinder volume of at least 3 dm³.

3. The combustion engine according to claim 1, wherein said combustion engine includes an engine block having a total cylinder volume of at least 5 dm³.

4. The combustion engine according to claim 1, wherein said combustion engine includes an engine block having a total cylinder volume of at least 7 dm³.

5. The combustion engine according to claim 1, wherein the combustion engine is powered by diesel or an alternative fuel.

6. The combustion engine according to claim 5, wherein the alternative fuel is selected from the group consisting of LNG (liquefied natural gas), CNG (compressed natural gas) and SNG (synthetic natural gas).

7. The combustion engine according to claim 1, wherein the engine management system includes a housing equipped with input connections for the ion sensing measurement device.

8. The combustion engine according to claim 1, further comprising an analyzing arrangement configured to detect events from more than one cylinder during one revolution.

9. The combustion engine according to 1, wherein the spark generating system is configured to provide information about discharge current, spark-over voltage, and primary current/voltage during the spark events; wherein the ignition control system receives the information about the discharge current, the spark-over voltage, and the primary current/voltage during the spark events from the spark generating system; and wherein the ignition control system is configured to detect misfiring through an analysis of the information about the discharge current, the spark-over voltage, and the primary current/voltage during the spark events received from the spark generating system.

10. A combustion engine comprising:
    a sensor device including an ion sensing measurement device configured to provide measurements of an ion current in said combustion engine during combustion;
    a spark generating system for causing spark events to generate the ion current in said combustion engine during combustion, wherein the spark generating system is configured to provide information about an operating parameter during each spark event, wherein the operating parameter comprises at least one of discharge current, spark-over voltage, and primary current/voltage;
    an engine management system, including an ignition control system that receives the measurements of the ion current in said combustion engine during combustion from the sensor device, and that receives the information about the operating parameter during each spark event from the spark generating system, wherein the engine management system is configured to control diluted operation of the combustion engine providing for peak values of at least 10% of diluted gas,
    wherein the ignition control system is configured to detect misfiring through a combined analysis comprising an analysis of the measurements of the ion current in said combustion engine during combustion received from the sensor device, the combined analysis further comprising an analysis of the information about the operating parameter during each spark event received from the spark generating system, wherein the engine management system is configured to control operation of the spark generating system and the peak values of diluted gas subsequent to each spark event based upon the combined analysis.

11. The combustion engine according to claim 10, wherein the diluted operation of the combustion engine provides for peak values of at least 15% of diluted gas.

12. The combustion engine according to claim 10, wherein the combustion engine is powered by an alternative fuel selected from the group consisting of LNG (liquefied natural gas), CNG (compressed natural gas) and SNG (synthetic natural gas).

13. A combustion engine comprising:
    a sensor device including an ion sensing measurement device configured to provide measurements of an ion current in said combustion engine during combustion;
    a spark generating system for causing spark events to generate the ion current in said combustion engine during combustion, wherein the spark generating system is configured to provide information about discharge current during each spark event;

an engine management system, including an ignition control system that receives the measurements of the ion current in said combustion engine during combustion from the sensor device, and that receives the information about the discharge current during each spark event from the spark generating system, wherein the ignition control system is configured to detect misfiring through a combined analysis comprising an analysis of the measurements of the ion current in said combustion engine during combustion received from the sensor device, the combined analysis further comprising an analysis of the information about the discharge current during each spark event received from the spark generating system, wherein the engine management system is configured to control an operating parameter of the spark generating system comprising at least one of discharge current, spark-over voltage, and primary current/voltage, subsequent to each spark event based upon the combined analysis, wherein the engine management system is configured to control diluted operation of the combustion engine, wherein the diluted operation provides for peak values of at least 15% of diluted gas.

\* \* \* \* \*